US005136342A

United States Patent [19]

Ida et al.

[11] Patent Number: 5,136,342

[45] Date of Patent: Aug. 4, 1992

[54] SHEET RESIST APPARATUS

[75] Inventors: Masayuki Ida, Yamato-Koriyama; Kozo Takahashi, Nara; Yuji Okamoto, Nara; Osamu Nakayama, Nara, all of Japan

[73] Assignee: Sharp Kabushiki Kaisha, Osaka, Japan

[21] Appl. No.: 761,652

[22] Filed: Sep. 18, 1991

[30] Foreign Application Priority Data

Sep. 25, 1990 [JP] Japan .................................. 2-254705

[51] Int. Cl.[5] .............................................. G03B 21/00

[52] U.S. Cl. ...................................... 355/317; 355/50; 355/316

[58] Field of Search .......................... 355/50, 316, 317

[56] References Cited

U.S. PATENT DOCUMENTS 4,669,853 6/1987 Sosinski et al. ..................... 355/317
4,708,456 11/1987 Shibata et al. ...................... 355/317
4,956,651 9/1990 Emori ................................ 355/316
5,043,771 8/1991 Shibata et al. ...................... 355/317

FOREIGN PATENT DOCUMENTS 51-51335 5/1976 Japan .

*Primary Examiner*—Monroe H. Hayes

[57] ABSTRACT

A sheet resist apparatus disposed in a transporting path of a recording sheet transported from a sheet supplying unit to an image forming unit in an image forming apparatus, includes: a pair of first rollers disposed in the transporting path; a pair of second rollers disposed in the transporting path at a downstream of the first rollers; a first driving device for rotating the first rollers to transport the recording sheet toward the second rollers; and a second driving device for rotating the second rollers to transport the recording sheet, which is transported from the first rollers, toward the image forming unit in synchronization with a timing of image-formation of the image forming unit. The sheet resist apparatus further includes: a sensor disposed between the first rollers and the second rollers for detecting a tip of the recording sheet transported from the first rollers; and a control device for controlling the first and second driving devices on a basis of a result of detection of the sensor, such that the first driving device stops driving once before the tip of the recording sheet reaches the second rollers, and such that the first driving device resumes driving earlier than the second driving device starts driving by a predetermined time period.

10 Claims, 7 Drawing Sheets

SHEET RESIST APPARATUS

BACKGROUND OF THE INVENTION

1. Field of the Invention

The present invention relates to a sheet resist apparatus, which can be utilized in an image forming apparatus such as a copying machine, a laser beam printer, a thermal or ink-jet head printer and so on.

2. Description of the Related Arts

The inventors of the present application know one kind of such image forming apparatuses equipped with a sheet resist apparatus, which is adapted to form a loop of the recording sheet at its tip portion such that the tip portion abuts a nip portion of a pair of resist rollers by the entering force of the loop in order to eliminate a possible inclination of the recording sheet caused during its transportation from a sheet supplying unit.

In this kind of sheet resist apparatus, a pair of transporting rollers are rotated by a driving device, such as a motor, so as to transport the recording sheet from a sheet supplying unit along a transporting path. At the downstream of the transporting rollers, there is disposed a sheet sensor for detecting the tip etc. of the transported recording sheet. The sheet sensor consists of a photo-sensor, for example.

At the downstream of the sheet sensor, there are disposed a pair of resist rollers for transporting the recording sheet in synchronization with the transfer timing of the toner image at the image forming unit, wherein the resist rollers are driven by a driving device, such as a motor.

Along the transporting path between the transporting rollers and the resist rollers, there are disposed guiding plates for guiding the recording sheet from the transporting rollers to the resist rollers, one of which is disposed at the upper side of the transported recording sheet and the other of which is disposed at the lower side of the transported recording sheet.

The upper guiding plate is made in such a shape as to offer a predetermined space above the transported recording sheet, so that the transported recording sheet is formed in a loop at its tip portion, at the upstream side of the resist rollers.

The operation of thus constructed sheet resist apparatus, is as following. Namely, when a start key of the image forming apparatus is turned on, the starting signal is inputted to a control unit of the sheet resist apparatus. Then, the control unit drives and controls the transporting rollers and the resist rollers so as to transport the recording sheet from the sheet supplying unit to the resist rollers through the transporting rollers.

When the sheet sensor detects the tip of the transported recording sheet, and is turned ON, the control unit sets the timer and stops driving the resist rollers. When the timer becomes in a state of count-out after counting a predetermined time period, the timer is reset and the transporting rollers are stopped. In this procedure, the tip of the recording sheet firstly abuts to the nip portion of the resist rollers, and a loop is formed of the recording sheet by the transporting force, and at this time, the inclination of the sheet is eliminated by the formed loop.

Then, the control unit checks if it is a timing of image-forming or not, and when it comes the timing of image-forming, the control unit drives again the transporting rollers and the resist rollers in a prescribed timing to transport the recording sheet to the image forming unit, so as to forming the image on the transported recording sheet.

However, in case that the recording sheet diversifies to a certain extent and in case that the image-forming speed of the image forming apparatus such as a copying machine etc. is increased, the above mentioned type of the sheet resist apparatus cannot always transport the recording sheet properly to the image forming unit in synchronization with the image transfer timing or cannot always eliminate the inclination of the recording sheet. This is because the loop of the sheet tends to disappear quickly as the recording sheet moves back toward the transporting rollers by its restitution force in some type of rigid recording sheet, even if the loop is once formed at the upstream of the resist rollers.

The thickness of the recording sheet used in the image forming apparatus is various i.e. in a range between 52 $g/m^2$ and 198 $g/m^2$, for example, while various types of sheet such as a color sheet, label sheet, a sheet for OHP (Over Head Projector), etc., are utilized as the recording sheet. Accordingly, in case of a relatively rigid recording sheet, the loop formed of the recording sheet by the sheet resist apparatus disappears quickly by the restitution force of the recording sheet. If the loop formed condition of the recording sheet is kept for a long time in order to obtain the appropriate timing of image-forming, the recording sheet may be curled. If the image-forming process is performed under this curled condition, the toner image cannot be certainly transferred onto the recording sheet, with a serious drawback of causing a white void of the transferred image at the vicinity of the tip of the recording sheet.

SUMMARY OF THE INVENTION

It is therefore an object of the present invention to provide a sheet resist apparatus of an image forming apparatus, which can eliminate the inclination of the transported recording sheet regardless of the image forming speed or the type of the recording sheet, without degrading the quality of the formed image.

According to the present invention, the above mentioned object can be achieved by a sheet resist apparatus disposed in a transporting path of a recording sheet transported from a sheet supplying unit to an image forming unit in an image forming apparatus. The sheet resist apparatus includes: a pair of first rollers disposed in the transporting path; a pair of second rollers disposed in the transporting path at a downstream of the first rollers; a first driving device for rotating the first rollers to transport the recording sheet toward the second rollers; and a second driving device for rotating the second rollers to transport the recording sheet, which is transported from the first rollers, toward the image forming unit in synchronization with a timing of image-formation of the image forming unit. The sheet resist apparatus further includes: a sensor disposed between the first rollers and the second rollers for detecting a tip of the recording sheet transported from the first rollers; and a control device for controlling the first and second driving devices on a basis of a result of detection of the sensor, such that the first driving device stops driving once before the tip of the recording sheet reaches the second rollers, and such that the first driving device resumes driving earlier than the second driving device starts driving by a predetermined time period.

According to the sheet resist apparatus of the present invention, the first driving device rotates the first rollers, so that the recording sheet can be transported toward the second rollers on the transporting path, and the second driving device rotates the second rollers, so that the recording sheet can be transported toward the image forming unit in synchronization with the timing of image-formation of the image forming unit. Here, the control device controls the first and second driving devices on the basis of the result of detection of the sensor, which is disposed between the first rollers and the second rollers and detects the tip of the transported recording sheet therebetween. Under the control of the control device, the first driving device stops driving once before the tip of the recording sheet reaches the second rollers, and the first driving device resumes driving earlier than the second driving device starts driving by the predetermined time period. Accordingly, the loop of the recording sheet is formed at the tip portion thereof after the tip of the recording sheet, which is transported by the first rollers, reaches the nip portion of the second rollers, which is not rotated yet. Thus, the possible inclination of the transported recording sheet is eliminated by this formed loop, and then, when the predetermined time period has passed, the second rollers start rotating to further transport the recording sheet without inclination to the image forming unit. In this manner, the loop can be made before the second rollers start rotating and, at the same time, the waiting time for the recording sheet, which is formed in a loop, to be transported by the second rollers, can be made quite short, with a result that a quite reliable elimination of the inclination and a precise and certain positioning of the tip of the recording sheet, are realized.

Consequently, the recording sheet, which is not curled and is free from inclination, can be speedily transported, through the sheet resist apparatus of the present invention, to the image forming unit in an appropriate synchronization with the timing of image formation thereof, to improve the quality of the formed image of the image forming apparatus.

In one aspect of the present invention, the control device controls the first and second driving devices such that the first driving device stops driving the first rollers once, when the sensor detects the tip of the recording sheet. In another aspect of the present invention, the control device controls the first and second driving devices such that the first driving device stops driving the first rollers once, after the sensor detects the tip of the recording sheet and before this tip reaches the second rollers. In either of these cases, the recording sheet is prevented from moving back toward the first rollers by the restitution force of the recording sheet even if the rigid recording sheet is utilized since the tip of the recording sheet does not abut the nip portion of the second rollers at this moment. And that, the loop can be formed by the transportation of the first rollers right before the recording sheet is transported by the second rollers under the control of the control device.

In another aspect of the present invention, the control device is adapted to change the predetermined time period. Accordingly, with respect to various types of the recording sheets, the inclination of the recording sheet can be effectively eliminated by adjusting the waiting time and the size of formed loop, without causing the aforementioned curled condition.

In another aspect of the present invention, the sheet resist apparatus further includes a braking device, which is disposed on a shaft of the first roller for braking the first roller by a friction force. Here, the first driving device drives the first roller by a friction force larger than the friction force of the braking device. Accordingly, the recording sheet can be quite reliably and precisely stopped before the tip of the recording sheet reaches the second rollers.

Further objects and advantages of the present invention will be apparent from the following description of the preferred embodiment of the invention as illustrated in the accompanying drawings.

DETAILED DESCRIPTION OF THE PREFERRED EMBODIMENT

A preferred embodiment of the present invention will be described below with reference to the accompanying drawings.

Figure 1:
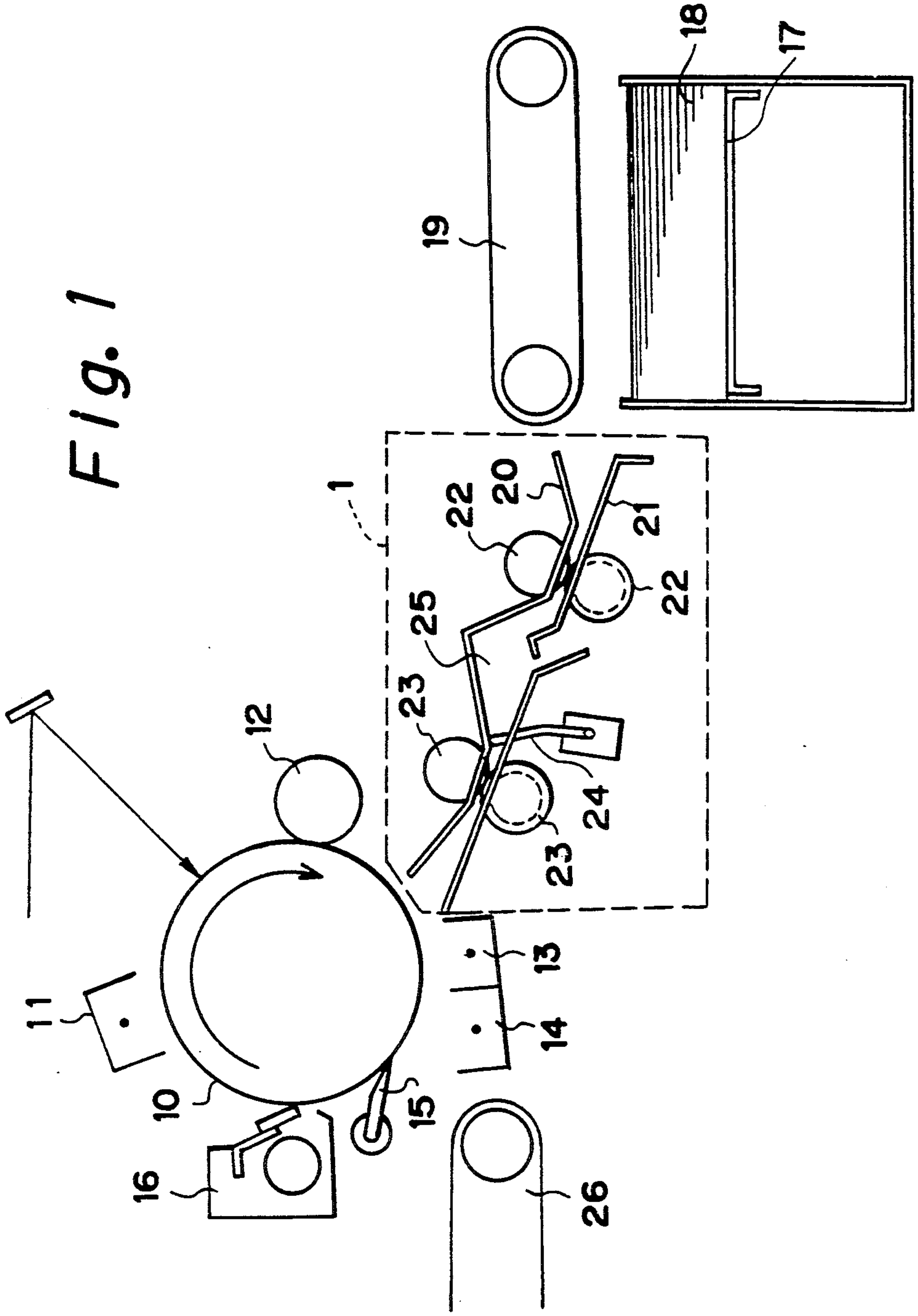
FIG. 1 is a schematic side view of a sheet resist apparatus as an embodiment of the present invention.

FIG. 1 shows an image forming apparatus realized as a copying apparatus, which is provided with a sheet resist apparatus 1. The image forming apparatus is also provided with a photosensitive dram 10, which plays an important roll of the electrophotographic image forming operation of the image forming apparatus, and which is adapted to rotate clockwise in the figure.

Around the photosensitive dram 10 in the order of this rotational direction, there are equipped an electric charger 11 for charging the photosensitive dram 10 before exposure of the image, a magnetic brash developing roller 12 for developing the latent image on the exposed photosensitive dram 10 by toner, a transferring charger 13 for transferring the toner on the photosensitive dram 10 onto a transported recording sheet 18, an electrostatic detaching charger 14 and a detaching nail 15 for detaching the recording sheet 18 from the photosensitive dram 10, a cleaner 16 for removing the residual toner etc. from the photosensitive dram 10 and so on.

At the right side of the sheet resist apparatus 1, there are equipped a sheet supplying tray 17, which is adapted to supply the recording sheet 18 one by one to the sheet resist apparatus 1, and a sheet supplying belt 19 for picking up and send out the recording sheet 18.

The sheet resist apparatus 1 is provided with an upper sheet guide 20, a lower sheet guide 21, a pair of sheet transporting rollers 22, a pair of sheet resist rollers 23, and a sheet sensor 24.

The upper sheet guide 20 is bent upwardly between the transporting rollers 22 and the resist rollers 23 so that a space 25 with a predetermined shape is provided above the transported recording sheet 18 between the transporting rollers 22 and the resist rollers 23. The space 25 allows to form the loop of the recording sheet 18 at its tip portion, in a prescribed manner explained later in detail.

The sheet sensor 24 is disposed upstream of the resist rollers 23, and detects the arrivals of the tip and the tale of the recording sheet 18.

The operation of the image forming apparatus is as following. Namely, when the photo-image of the original is exposed by an exposing optical system onto the photosensitive dram 10 between the electric charger 11 and the developing roller 12, a latent image is formed on the photosensitive dram 10.

The recording sheet 18 stacked on the sheet supplying tray 17 is one by one picked up by the sheet supplying belt 19 in the order from the top to the bottom, sent out to the sheet guides 20 and 21, and then is guided by the sheet guides 20 and 21 to the transporting rollers 22, which pinch the guided recording sheet 18.

The recording sheet 18 pinched between the transporting rollers 22, is further transported toward the resist rollers 23.

The resist rollers 23 are adapted to transport the recording sheet 18 so as to synchronize it with the toner image on the photosensitive dram 10 at the image transferring position of the transferring charger 13. Then, the recording sheet 18 onto which the toner image has been transferred, is detached from the photosensitive dram 10 by the electrostatic detaching charger 14 and the detaching nail 15, and is transported to a fixing device not shown, by a transporting belt 26.

Figure 2:
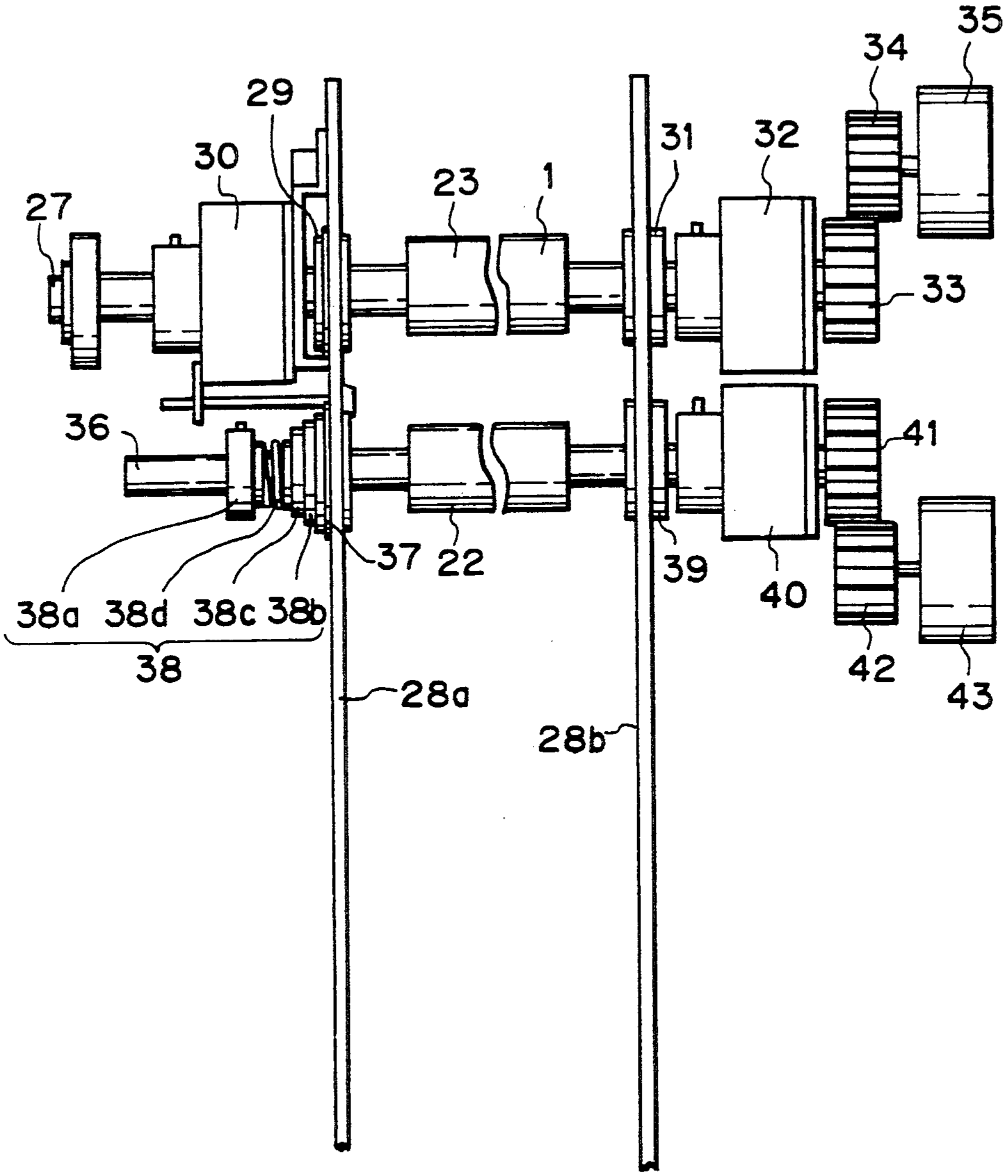
FIG. 2 is a schematic plan view showing transporting rollers and resist rollers of the sheet resist apparatus of FIG. 1.

FIG. 2 shows the driving mechanism of the sheet resist apparatus 1 for driving the transporting rollers 22 and the resist rollers 23.

In FIG. 2, one end (left end in the figure) of a rotational shaft 27 of the resist roller 23, is attached to an electromagnetic braking clutch 30 via a bearing 29 of a front side frame member 28*a* of the main body of the image forming apparatus.

The braking clutch 30 is fixed on the front side frame member 28*a*. The shaft 27 is fixed with respect to the front side frame member 28*a* when the braking clutch 30 is in the ON condition, while the shaft 27 can freely rotate when the braking clutch 30 is in the OFF condition.

The other end (right end in the figure) of the shaft 27 of the resist roller 23, is attached to the electromagnetic driving clutch 32 via a bearing 31 of a rear side frame member 28*b* of the main body of the image forming apparatus.

The driving clutch 32 is connected to a driving gear 34 via an idle gear 33, while the driving gear 34 is always driven by a motor 35. Namely, the rotational driving force from the motor 35 to be transmitted to the shaft 27, is not transmitted when the driving clutch 32 is in the OFF condition, and is transmitted when the driving clutch 32 is in the ON condition.

One end (left end in the figure) of a rotational shaft 36 of the transporting roller 22, is attached to a braking device 38 via a bearing 37 of the front side frame member 28*a*.

The braking device 38 includes a collar 38*a* fixed on the shaft 36, a ring friction member 38*b* made of metal etc. through which the shaft 36 penetrates, a ring friction member 38*c* made of Jurakon (Trade Name) made by Poliplastic Co. Ltd. for example, and a spring 38*d* disposed between the collar 38*a* and the ring friction member 38*c* for pressing the ring friction member 38*c* and the ring friction member 38*b* onto the plane of the front side frame member 28*a* by a predetermined pressure.

The other end (right end in the figure) of the shaft 38 of the transporting roller 22, is attached to an electromagnetic clutch 40 via a bearing 39 of the rear side frame member 28*b*, in a similar manner as in the case of the resist rollers 23. The clutch 40 is connected to a driving gear 42 via an idle gear 41, while the driving gear 42 is always driven by a motor 43.

Accordingly, in a similar manner as in the case of the resist rollers 23, the rotational driving force from the motor 43 to be transmitted to the shaft 36, is not transmitted when the clutch 40 is in the OFF condition, and is transmitted when the clutch 40 is in the ON condition.

Figure 3:
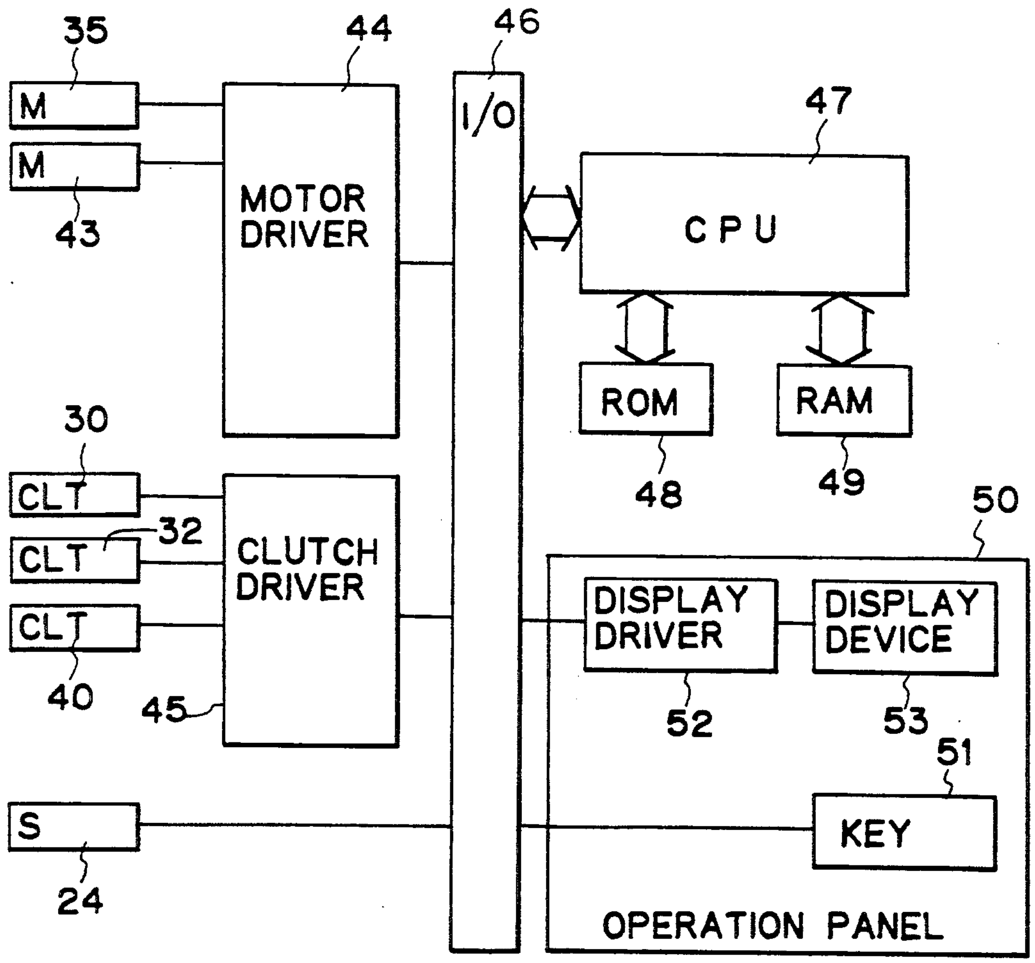
FIG. 3 is a block diagram showing an electric control system of the sheet resist apparatus of FIG. 1.

FIG. 3 shows a construction of an electric control portion of the sheet resist apparatus.

In FIG. 3, the motors 35 and 43 (shown also in FIG. 2) are connected to a motor driver 44, while the clutches 30, 32 and 40 (shown also in FIG. 2) are connected to a clutch driver 45.

The motor driver 44, the clutch driver 45 and the sheet sensor 24 (shown also in FIG. 1), are connected to an I/O (Input/Output) unit 46. The I/O unit 46 is connected to a CPU (Central Processor Unit) 47, through which the detection signal of the sheet sensor 24 is inputted to the CPU 47. The CPU 47 controls the motors 35 and 43, and the clutches 30, 32 and 40, via the motor driver 44 and the clutch driver 45, respectively.

The control program for the CPU 47 is stored in a ROM (Read Only Memory) 48 in advance, while a RAM (Random Access Memory) 49 offers a buffer memory area and a calculation area such as a flag, a counter, and a timer necessary for the control of the copying operation.

The I/O unit 46 is also connected to an operation panel 50 i.e. an operation key 51, which is explained next with referring to FIG. 4, and a display driver 52, which is connected to a display device 53.

Figure 4:
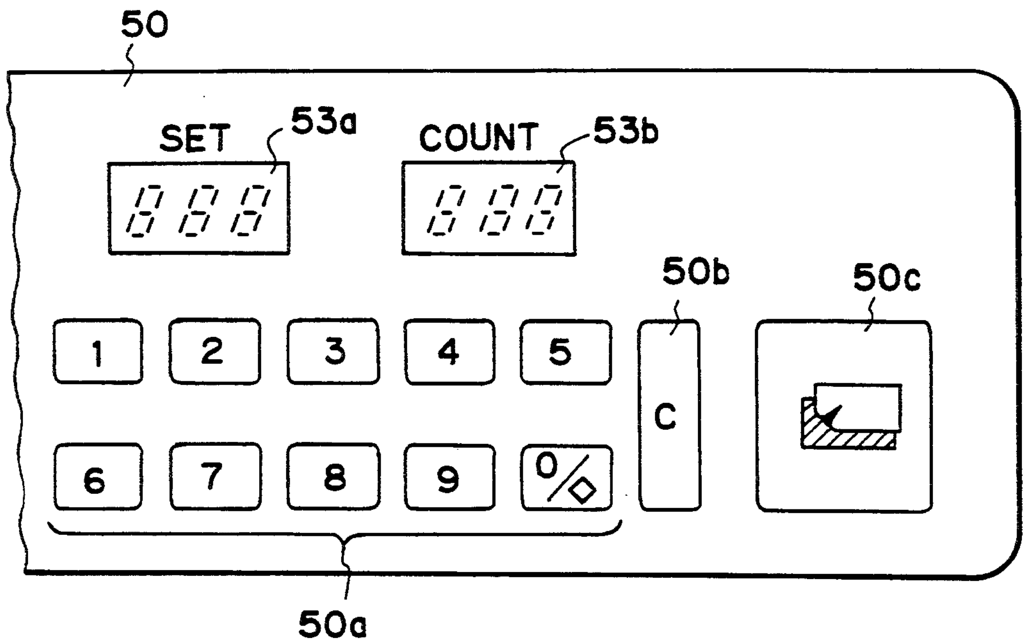
FIG. 4 is a schematic plan view showing an operation panel of the sheet resist apparatus of FIG. 1

FIG. 4 shows the main portion of the operation panel 50.

In FIG. 4, the operation panel 50 includes a ten key switch 50*a* for setting the copy number etc., a clear key 50*b* for clearing the set copy number etc., a print switch 50*c* for starting the copy operation, a set display portion 53*a* for displaying the set copy number etc., a count display portion 53*b* for displaying the currently copied number etc. and so on.

The CPU 47 in FIG. 3 controls the display driver 52 to drive the set display portion 53*a* in FIG. 4, so as to display the copy number set by means of the ten key switch 50*a*. When the print switch 50*c* is pushed, the CPU 47 controls the mechanism shown in FIGS. 1 and 2 to perform the copy operation, counts the currently copied number and controls the display driver 52 to drive the count display portion 53*b* in FIG. 4, so as to display the currently copied number. When the currently copied number becomes equal to the set copy number, the CPU 47 controls the display driver 52 to drive the count display portion 53*b* in FIG. 4, so as to display "0".

Figure 5:
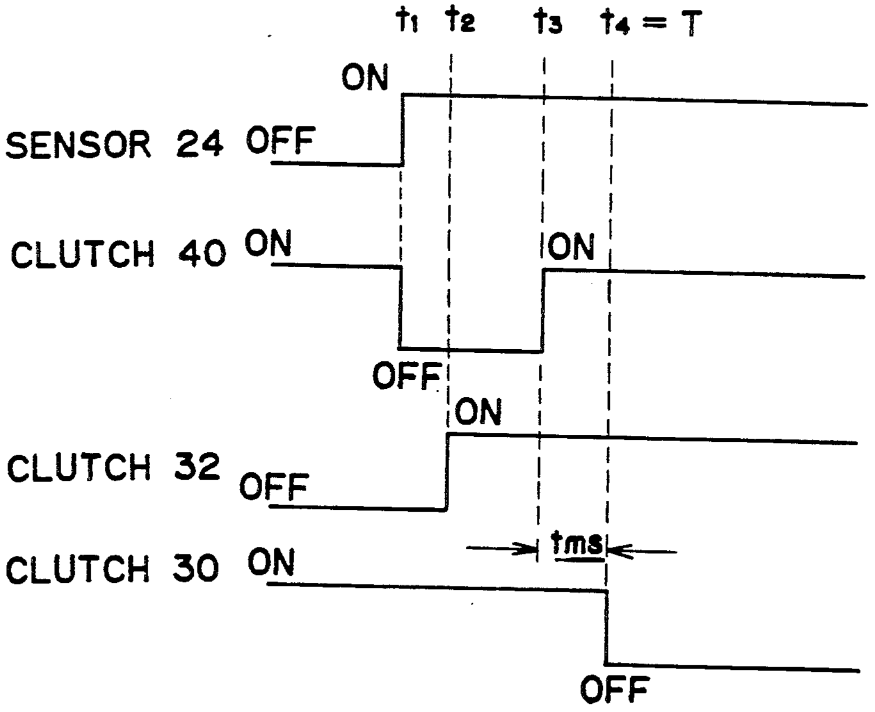
FIG. 5 is a timing chart showing an operation of the sheet resist apparatus of FIG. 1.

FIG. 5 shows the timing chart of the operation by the CPU 47 to control the transporting rollers 22 and the resist rollers 23 via the motors 35 and 43, and the clutches 30, 32 and 40.

Figure 6A:
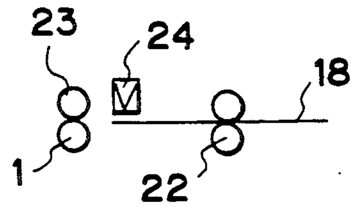
FIGS. 6A to 6C are explanatory views showing the condition of the transported recording sheet in the sheet resist apparatus of FIG. 1.
Figure 6B:
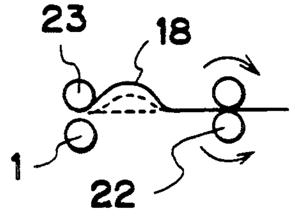
Figure 6C:
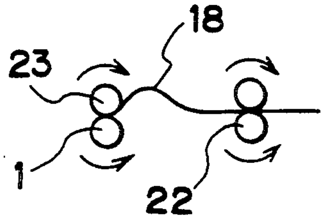

FIGS. 6A to 6C show the various conditions of the recording sheet 18 in the sheet resist apparatus 1. As shown in FIG. 6, the loop is formed of the recording sheet 18 at its tip portion, in the sheet resist apparatus 1, in which the CPU 47 in FIG. 3 controls in the manner shown in the timing chart of FIG. 4.

The operation of the sheet resist apparatus 1 of FIG. 1, will be explained in more detail with referring to the flowchart of FIG. 7, and these FIGS. 1 to 6.

Figure 7:
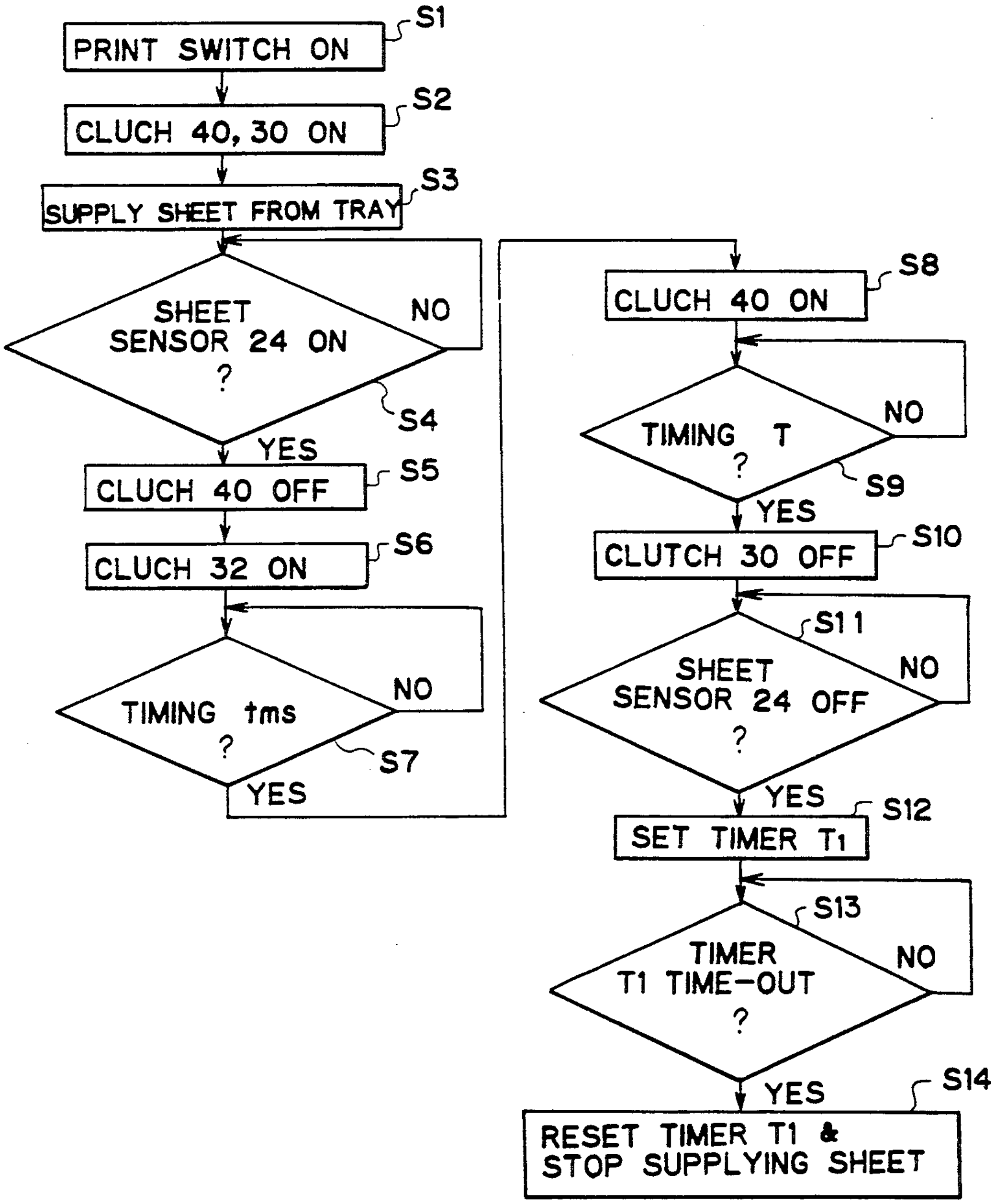
FIG. 7 is a flowchart showing an operation of the sheet resist apparatus of FIG. 1.

In FIG. 7, at the step S1, the print switch 50*c* is pushed ON, and the copy number is set via the ten key switch 50*a*. Then, CPU 47 starts the electrostatic processing device shown in FIG. 1, and make the clutch 40 and the braking clutch 30 in the ON condition, at the step S2.

The recording sheet 18 positioned at the top of the pile on the sheet supplying tray 17, is picked up by the sheet supplying belt 19, guided by the sheet guides 20 and 21 to the transporting rollers 22, pinched between the transporting rollers 22 and transported toward the resist rollers 23, at the step S3.

When the sheet sensor 24 detects the tip of the recording sheet 18 at the time t1 in FIG. 5, the sheet sensor 24 is turned ON at the step S4, and the flow branches to the step S5. Then, the clutch 40 is made in the OFF condition at the step S5, and the transporting rollers 22 is stopped before the tip of the recording sheet 18 reaches the nip portion of the resist rollers 23 as shown in FIG. 6A.

This stopping control is executed by the braking device 38 shown in FIG. 2, wherein the control friction force of the braking device 38 with respect to the transporting rollers 22 is set smaller than the driving force of the motor 43 with respect to the transporting rollers 22.

Then, at the time t2 shown in FIG. 5, the braking clutch 30 is in the ON condition in order to prepare starting the rotation of the resist rollers 23, and the driving clutch 32 is made in the ON condition at the step S6. That is to say, the resist rollers 23 is not started yet to rotate by virtue of the braking clutch 30 at the time t2.

Then, it is checked if it comes the time t3, as shown in FIG. 5, which is before the transfer timing T (=t4) of the electrostatic processing device in FIG. 1, by a timing (predetermined time period) tms or not, at the step S7. This checking process of the step S7 is repeated until the time t3 coincides with the time which is before the transfer timing T (=t4) by the timing tms.

In the above mentioned step S7, if it comes the time t3, which is before the transfer timing T by the timing tms, the flow branches to the step S8. At the step S8, the CPU 47 outputs the control signal to the clutch 40 so as to make the clutch 40 in the ON condition. As a result, the inclination of the recording sheet 18 is eliminated as the loop is formed by abutting the nip portion of the rollers at the tip of the recording sheet 18, as shown in FIG. 6B.

Then, at the step S9, it is checked if it comes the time t4 (=T) when the timing (predetermined time period) tms has passed after the time t3 or not, and this checking process is repeated until it comes the time t4.

At the time t4 (=T) after the predetermined time period tms has passed, the flow branches to the step S10. At the step S10, the braking clutch 30 is made in the OFF condition as shown in FIG. 5. In this case, as aforementioned, since the clutch 40 is in the ON condition, and the driving clutch 32 is also in the ON condition, the recording sheet 18 is started to be transported to the transfer position by the resist rollers 23 and the transporting rollers 22 as shown in FIG. 6C.

After the start of the transportation of the recording sheet 18 as mentioned above, the operation is continued as following. Namely, at first, at the step S11, it is checked if the tale of the recording sheet 18 has passed through the sheet sensor 24 or not, according to the condition of the sheet sensor 24, and this checking process is repeated until the sheet sensor 24 is turned OFF, i.e. until the tale of the recording sheet 18 passes through the sheet sensor 24. When the sheet sensor 24 is turned OFF, the flow branches to the step S12.

At the step S12, the time necessary for the recording sheet 18 to further pass through the resist rollers 23 after passing though the sheet sensor 24, is set to the timer as the time period T1. Then, the CPU 47 checks the count-out of the timer i.e. the time out of the time period T1 at the step S13. If it is judged that the time period T1 has expired at the step S13, the flow branches to the step S14. At the step S14, it is assumed that the tale of the recording sheet 18 has passed through the resist rollers 23, and thus the CPU 47 stops the transporting rollers 22 and the resist rollers 23 so as to stop the transportation of the recording sheet 18, and at the same time, the reset and stop the timer.

In this embodiment as described above, the loop is formed of the recording sheet 18 at the tip portion thereof while making the clutch 40 in the ON condition, at the time t3 which is before the transfer timing T (=t4) by the predetermined time period tms.

Figure 8:
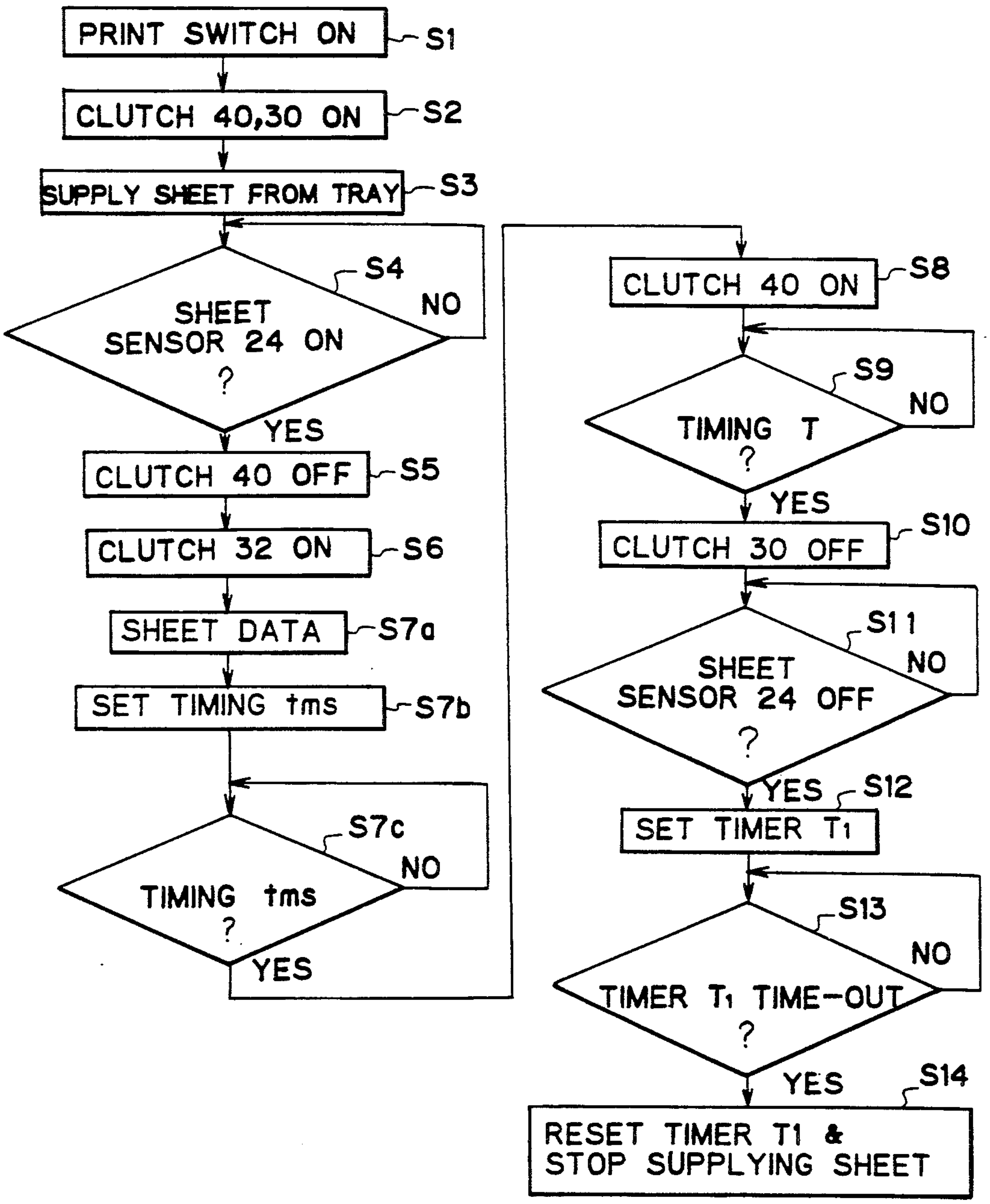
FIG. 8 is a flowchart showing another operation of the sheet resist apparatus of FIG. 1.

The step S7 in FIG. 7 may be replaced by the substeps 7*a* to 7*c* shown in the flowchart of FIG. 8, which shows another operation of the sheet resist apparatus 1 of FIG. 1. The flowchart of FIG. 8 is different from that of FIG. 7 only as for the step S7, otherwise the steps are same. Therefore, the same reference numerals are attached to these same steps, and the explanations thereof are omitted.

In FIG. 8, in case that the timing (predetermined time period) tms is to be changed according to the characteristic of the recording sheet, the characteristic of the recording sheet is automatically detected, and the recording sheet data set by the operator in advance, is read out from the RAM 49 at the step S7*a*. Then, the appropriate timing tms is set on the basis of the record sheet data read out from the RAM 49 at the step S7*b*. Then, it is checked if it is before the timing T by the set timing tms or not. If it is before the timing T by the set timing tms, the flow branches to the step S7*c*. At the step S7*c*, the control signal is outputted from the CPU 47, to make the clutch 30 OFF.

In the above mentioned sub-steps 7*a* to 7*c* in FIG. 8, the predetermined time period tms may be stored into the RAM 49 as a standard time period t, which corresponds to an average sheet, after and adjustment for each image forming apparatus at its shipment, since the appropriate time period tms depends on the material of the rotating members such as the transporting rollers 22, and the type and characteristic of the recording sheet 18. Alternatively, a plurality of the standard time periods peculiar to each type of the recording sheet, may be stored in the RAM 48 in advance, and one of them can be selected by directing the type of the sheet by the operator through the operation panel 50 just before the relevant copy operation. Further, the predetermined time period tms may be set by automatically judging the characteristic of the sheet with referring to the photopermeability of the recording sheet 18, the electric resistance of the recording sheet 18, or the electrostatic capacity of the recording sheet 18.

Accordingly, by the above mentioned embodiment, since the clutch 40 is made in the ON condition and the loop is formed at the tip portion of the recording sheet 18 at the time t3, which is before the transfer timing T (=t4) by the predetermined time period tms, the inclination of the recording sheet 18 is effectively avoided by setting the standard time period t for each different type of the sheet. Further, the predetermined time period tms may be changed in the CPU 47 by an external input command, through the operation panel, for example.

As described in detail above, according to the sheet resist apparatus 1 of the present embodiment, the CPU 47 controls the motors 35 and 43 on the basis of the result of detection of the sheet sensor 24. Under the control of the CPU 47, the motor 43 stops driving the transporting rollers 23 once before the tip of the recording sheet 18 reaches the resist rollers 23, and the motor 43 resumes driving the transporting rollers 22 earlier than the motor 35 starts driving the resist rollers 23 by the predetermined time period. Accordingly, the loop of the recording sheet 18 is formed at the tip portion thereof after this tip of the recording sheet 18 reaches the nip portion of the resist rollers 23. Thus, the possible inclination of the transported recording sheet 18 is eliminated by this formed loop, and then, when the predetermined time period has passed, the resist rollers 23 start rotating to further transport the recording sheet 18 to the photosensitive dram 10.

In this manner, the loop can be made before the resist rollers 23 start rotating and, at the same time, the waiting time for the recording sheet 18, which is formed in a loop, can be made quite short, with a result that a quite reliable elimination of the inclination and a precise and certain positioning of the tip of the recording sheet 18 are realized.

Consequently, the recording sheet 18, which is not curled and is free from inclination, can be speedily transported, through the sheet resist apparatus 1, to improve the quality of the formed image of the image forming apparatus.

Many widely different embodiments of the present invention may be constricted without departing from the spirit and scope of the present invention. It should be understood that the present invention is not limited to the specific embodiments described in this specification, except as defined in the appended claims.

What is claimed is:

1. A sheet resist apparatus disposed in a transporting path of a recording sheet transported from a sheet supplying unit to an image forming unit in an image forming apparatus, comprising:

- a pair of first rollers disposed in said transporting path;
- a pair of second rollers disposed in said transporting path at a downstream of said first rollers;
- a first driving means for rotating said first rollers to transport said recording sheet toward said second rollers;
- a second driving means for rotating said second rollers to transport said recording sheet, which is transported from said first rollers, toward said image forming unit in synchronization with a timing of image-formation of said image forming unit;
- a sensor disposed between said first rollers and said second rollers for detecting a tip of said recording sheet transported from said first rollers; and
- a control means for controlling said first and second driving means on a basis of a result of detection of said sensor, such that said first driving means stops driving once before said tip reaches said second rollers, and such that said first driving means resumes driving earlier than said second driving means starts driving by a predetermined time period.

2. A sheet resist apparatus according to claim 1, wherein said control means controls said first and second driving means such that said first driving means stops driving once when said sensor detects said tip.

3. A sheet resist apparatus according to claim 1, wherein said control means controls said first and second driving means such that said first driving means stops driving once after said sensor detects said tip and before said tip reaches said second rollers.

4. A sheet resist apparatus according to claim 1, wherein said control means is adapted to change said predetermined time period.

5. A sheet resist apparatus according to claim 1, further comprising a braking means disposed on a shaft of said first roller for braking said first roller by a friction force, said first driving means drives said first roller by a friction force larger than said friction force of said braking means.

6. A sheet resist apparatus according to claim 1, wherein said transporting path comprises an upper sheet guide plate and a lower sheet guide plate, said upper sheet guide plate formed in a shape to provide a space above said transported recording sheet between said first rollers and said second rollers.

7. A sheet resist apparatus according to claim 1, further comprising a clutch disposed between said first rollers and said first driving means and controlled by said control means for selectively transmitting a driving force of said first driving means to said first rollers.

8. A sheet resist apparatus according to claim 1, further comprising a clutch disposed between said second rollers and said second driving means and controlled by said control means for selectively transmitting a driving force of said second driving means to said second rollers.

9. A sheet resist apparatus according to claim 1, wherein said control means includes a timer for counting said predetermined time period after said recording sheet is once stopped.

10. A sheet resist apparatus according to claim 1, wherein said sensor comprises a photo-sensor.

* * * * *